Aug. 18, 1931.  E. C. WALKER  1,819,663
LUBRICATING DEVICE
Filed Feb. 7, 1930
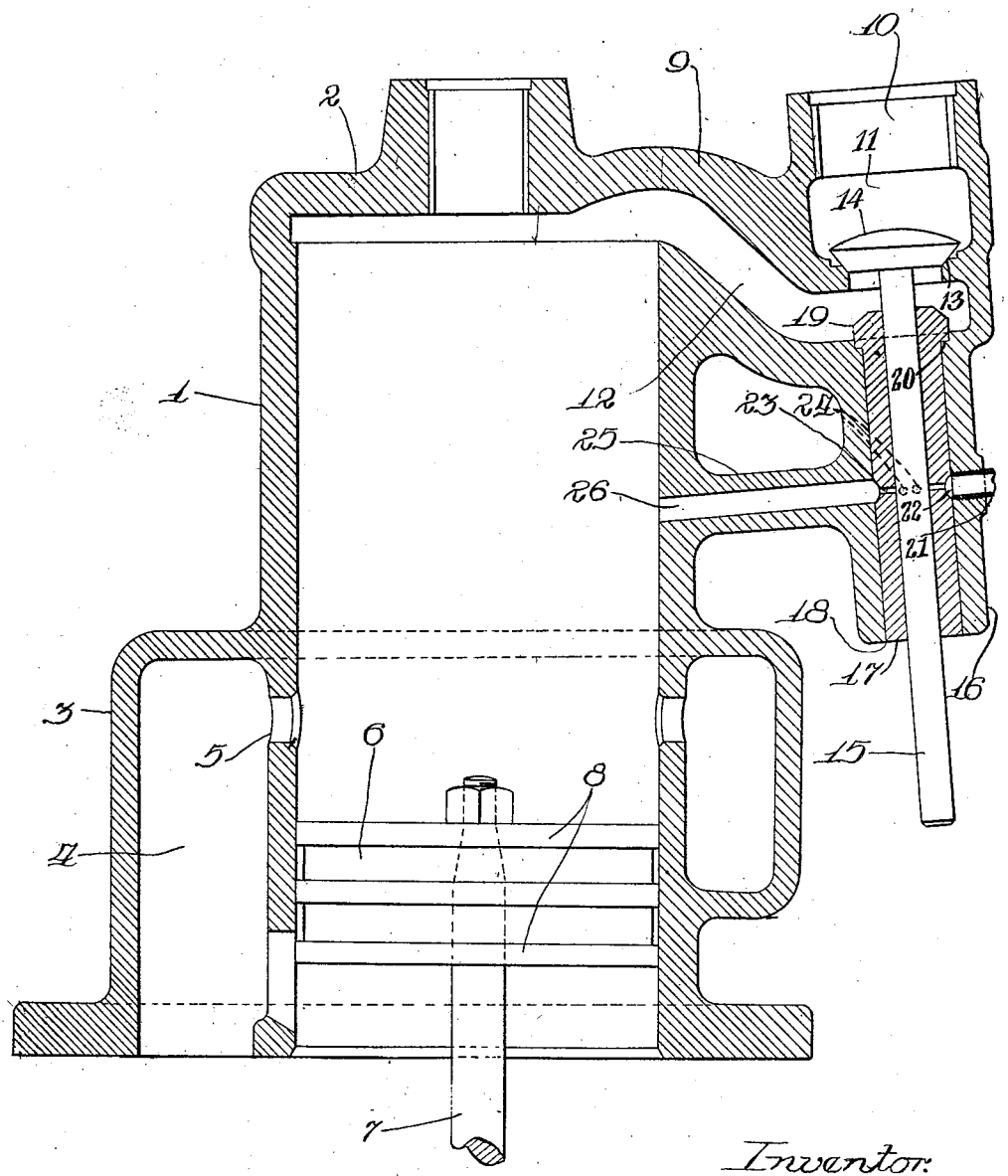
Inventor:
Earl C. Walker
By H.P. Doolittle
Atty.

Patented Aug. 18, 1931

1,819,663

UNITED STATES PATENT OFFICE

EARL C. WALKER, OF CHICAGO, ILLINOIS, ASSIGNOR TO INTERNATIONAL HARVESTER COMPANY, A CORPORATION OF NEW JERSEY

LUBRICATING DEVICE

Application filed February 7, 1930. Serial No. 426,523.

This invention relates to lubricating means for reciprocating engines. More specifically, it relates to combined valve and cylinder lubricating means for steam engines.

The principal object of the invention is to provide an improved and simplified means for lubricating the valve stem and for supplying lubricant to the cylinder in an engine employing force feed lubrication.

Another object is to arrange the lubricant channels so that only one connection is necessary with the lubricant supply conduit.

The drawing and detailed description to follow illustrates and describes means for attaining these and other objects, which will be apparent.

The single figure of the drawing shows a cross section of a steam engine cylinder in which the lubricating means of the invention is employed.

The engine cylinder shown is a portion of a steam engine of the uni-flow type. The main cylinder wall 1 has an integral head portion 2. An integral cored portion 3 at the lower end of the cylinder forms an annular exhaust steam passage 4. A series of circular exhaust ports 5 are positioned around the cylinder to provide outlets from the interior of the cylinder to the annular passage 4.

A short piston 6 of the type ordinarily used in steam engines is mounted for reciprocation in the cylinder. The piston is rigidly secured to a piston rod 7, which is adapted to be connected to a crosshead guide, not shown. A series of rings 8 are positioned on the piston.

An extension 9 integral with the cylinder wall is curved to form a steam inlet passage 10, a valve chamber 11, and an inlet passage 12 to the cylinder. The portion of the extension 9 of the inlet passage 10 is provided with suitable means, not shown, for connection to a source of high pressure steam. A bevel seat 13 is provided in the valve chamber at the outlet side thereof. A valve head 14 adapted to engage the seat 13 is mounted on a valve stem 15.

A substantially cylindrical extension 16, integral with the extension 9, projects downwardly to form a valve guide support. A valve guide 17 is fitted into a cylindrical bore 18 in the extension 16. A head 19 on the guide 17 engages a shoulder 20 at the top of the bore 18. The valve stem 15 extends centrally through the guide 17 and is adapted to be reciprocated therein.

For lubricating the piston and the valve stem, a lubricant conduit 21 is attached to the extension 16 intermediate its ends and communicates with an opening 22 therethrough. An annular channel 23 extends around the outer periphery of the valve guide 17 and communicates with the opening 22. A series of small radial ducts 24 extend from the annular channel 23 through the guide 17.

A bracket 25 integral with the cylinder wall and with the extension 16 extends between said elements. A lubricant passage 26 extends centrally through the bracket 25 and communicates with the interior of the cylinder and with the annular channel 23.

It will be noted that the passage 26 is aligned with the opening 22 in the wall of the extension 16. By this construction both of said passages may be formed by drilling transversely of the extension 16 and longitudinally of the bracket 25 after the casting forming the cylinder block has been made.

In the operation of this device, the engine is put into operation, the valve being operated by any conventional mechanism. Lubricant under pressure supplied to the conduit 21 passes around the annular channel 23. A portion of the lubricant passes through the radial openings 24, thereby lubricating the valve stem. The remainder of the lubricant passes through the passage 26 to the cylinder of the engine. The lubricant is fed and metered by any conventional lubricator preferably of the mechanical force feed type.

Although applicant has shown and described his invention as embodied in one cylinder of a steam engine of the uni-flow type, its use is contemplated for any type of engine or similar device where the invention may be utilized. Claim to invention is limited only by the scope of the appended claims.

What is claimed is:

1. In an engine, a cylinder, a valve guide support rigid with respect to said cylinder, a valve guide fitted in said support, lubricating means comprising an oil channel formed around said valve guide, a duct formed in the valve guide and leading from said channel to the interior of the guide, a conduit leading from the channel to the interior of the cylinder, and means to supply lubricant to said lubricating means.

2. In an engine, a cylinder, a valve guide support rigid with respect to said cylinder, a valve guide fitted in said support, lubricating means comprising an annular channel formed around said valve guide, a duct formed in the valve guide leading from said channel to the interior of the guide, a conduit leading from the annular channel to the interior of the cylinder, and means to supply lubricant to said lubricating means.

3. In an engine, a cylinder, a valve guide support rigid with respect to said cylinder, a valve guide fitted in said support, lubricating means comprising an oil channel formed around said valve guide, a duct formed in the valve guide and leading from said channel to the interior of the guide, a lubricant conduit leading from the channel to the interior of the cylinder, and means to supply lubricant under pressure to said channel.

4. In an engine, a cylinder, a valve guide support rigid with respect to the cylinder, a valve fitted in said support, lubricating means for said guide and said cylinder comprising a channel around the valve guide, a duct leading from said channel to the interior of the valve guide, a straight lubricant conduit from said channel to the interior of the cylinder, an opening formed in the valve guide support in alignment with the conduit and in communication with the channel, and means for supplying lubricant to the lubricating means.

5. In an engine, a cylinder, a valve guide support rigid with respect to the cylinder, a valve fitted in said support, lubricating means for said guide and said cylinder comprising a channel formed around the valve guide, a duct formed in the valve guide and leading from said channel to the interior of the valve guide, a straight lubricant conduit from said channel to the interior of the cylinder, an opening formed in the valve guide support in alignment with the conduit and in communication with the channel, and a lubricant supply conduit in communication with said opening.

6. In an engine, a cylinder, a valve guide support, an integral connection between the valve guide support and the cylinder, a valve guide fitted in said support, lubricating means for said guide and said cylinder comprising a channel formed around the valve guide, a duct leading from said channel to the interior of the valve guide, a straight passage-way through the integral connection and communicating with said channel and with the interior of the cylinder, an opening in the valve guide support in alignment with the passage-way and in communication with the channel, and a lubricant supply conduit in communication with said opening.

Chicago, Illinois, January 16th, 1930.

In testimony whereof, I affix my signature.

EARL C. WALKER.